US012560908B2

(12) United States Patent
Takii et al.

(10) Patent No.: US 12,560,908 B2
(45) Date of Patent: Feb. 24, 2026

(54) CONTROLLER FOR CONTROLLING AN INDUSTRIAL MACHINE USING A PROGRAM

(71) Applicant: FANUC CORPORATION, Yamanashi (JP)

(72) Inventors: Kou Takii, Yamanashi (JP); Shinichirou Itakura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 459 days.

(21) Appl. No.: 18/006,725

(22) PCT Filed: Aug. 3, 2021

(86) PCT No.: PCT/JP2021/028788
§ 371 (c)(1),
(2) Date: Jan. 25, 2023

(87) PCT Pub. No.: WO2022/030496
PCT Pub. Date: Feb. 10, 2022

(65) Prior Publication Data
US 2023/0273592 A1      Aug. 31, 2023

(30) Foreign Application Priority Data

Aug. 7, 2020      (JP) ................................. 2020-135198

(51) Int. Cl.
*G05B 19/4155*           (2006.01)
(52) U.S. Cl.
CPC .................... *G05B 19/4155* (2013.01); *G05B 2219/31449* (2013.01)
(58) Field of Classification Search
CPC ...... G05B 19/4155; G05B 2219/31449; G05B 2219/36261

(Continued)

(56) References Cited

U.S. PATENT DOCUMENTS

2013/0245792 A1      9/2013  Anzai et al.
2015/0105879 A1*     4/2015  Hatanaka ............... G05B 19/18
                                                             700/86

(Continued)

FOREIGN PATENT DOCUMENTS

CN         104011612 A      8/2014
CN         106503570 B      3/2017

(Continued)

OTHER PUBLICATIONS

International Search Report in PCT/JP2021/028788, mailed Oct. 26, 2021, 2pp.

*Primary Examiner* — Jigneshkumar C Patel
(74) *Attorney, Agent, or Firm* — HAUPTMAN HAM, LLP

(57) ABSTRACT

A controller includes a setting information storage unit that stores at least a folder search priority order setting defining an order of priority in which folders are searched when a program is called, a call information storage unit that stores call information, which is information relating to a correspondence relationship between a call source program and a call destination program among programs stored in advance in a program storage unit, a call information generation unit that generates call information when there is a possibility that the correspondence relationship between the programs has changed, and a call information determination unit that determines whether or not the correspondence relationship between the programs has changed by comparing the call information generated by the call information generation unit with the call information stored in the call information storage unit.

10 Claims, 6 Drawing Sheets

(58) Field of Classification Search
    USPC ........................................................ 700/28
    See application file for complete search history.

(56)                    References Cited

U.S. PATENT DOCUMENTS

2016/0378098 A1    12/2016  Inoue
2018/0150064 A1     5/2018  Ishigure
2018/0189486 A1*    7/2018  Yoshimura ............ G06F 21/563
2019/0271968 A1     9/2019  Kimura et al.

FOREIGN PATENT DOCUMENTS

CN        108107843  A     6/2018
CN        109287123  A     1/2019
JP        H11-143756 A     5/1999
JP        200114013  A     1/2001
JP        200376405  A     3/2003
JP        201716233  A     1/2017
JP        2019153042 A     9/2019

* cited by examiner

FIG.3

| CALL SOURCE | CALL DESTINATION |
|---|---|
| FOLDER1/00001 | LIBRARY/01001 |
| FOLDER1/00001 | LIBRARY/04002 |
| FOLDER1/00001 | MTB2/05003 |
| ... | ... |

FIG.4

| CALL SOURCE | CALL DESTINATION |
|---|---|
| FOLDER1/00001 | LIBRARY/01001 |
| FOLDER1/00001 | MTB1/04002 |
| FOLDER1/00001 | MTB2/05003 |
| FOLDER1/00002 | LIBRARY/01001 |
| FOLDER2/00004 | MTB2/05007 |
| FOLDER2/00008 | LIBRARY/01011 |
| ... | ... |

FIG.5

| CALL SOURCE | CALL DESTINATION |
|---|---|
| FOLDER1/00001 | LIBRARY/01001 |
| FOLDER1/00001 | MTB1/04002 |
| FOLDER1/00001 | MTB2/05003 |
| FOLDER1/00002 | LIBRARY/01001 |
| FOLDER2/00004 | MTB2/05007 |
| FOLDER2/00008 | LIBRARY/01011 |
| ⋮ | ⋮ |

MATCH

NO MATCH→

MATCH

| CALL SOURCE | CALL DESTINATION |
|---|---|
| FOLDER1/00001 | LIBRARY/01001 |
| FOLDER1/00001 | LIBRARY/04002 |
| FOLDER1/00001 | MTB2/05003 |
| ⋮ | ⋮ |

PROGRAM ADDED (LIBRARY/04002), LEADING TO CHANGE IN CORRESPONDENCE RELATIONSHIP BETWEEN PROGRAMS

DETAILS :

BEFORE CHANGE :  CALL SOURCE    CALL DESTINATION
                 FOLDER1/00001 ―― MTB1/04002

AFTER CHANGE :   CALL SOURCE    CALL DESTINATION
                 FOLDER1/00001 ―― LIBRARY/04002

IF CHANGED CORRESPONDENCE RELATIONSHIP IS OK, PRESS CONTINUE BUTTON.
IF NOT, PRESS CANCEL BUTTON

CONTINUE

CANCEL

FIG.7

| CALL SOURCE | CALL DESTINATION |
|---|---|
| FOLDER1/00001<br>SIZE: 102,321byte,<br>TIMESTAMP:2020/11/10 xx:xx:xx | LIBRARY/01001<br>SIZE: 13,500byte,<br>TIMESTAMP:2018/5/9 xx:xx:xx |
| FOLDER1/00001<br>SIZE: 102,321byte,<br>TIMESTAMP:2020/11/10 xx:xx:xx | LIBRARY/04002<br>SIZE: 43,906byte,<br>TIMESTAMP:2019/9/22 xx:xx:xx |
| FOLDER1/00001<br>SIZE: 102,321byte,<br>TIMESTAMP:2020/11/10 xx:xx:xx | MTB2/05003<br>SIZE: 31,842byte,<br>TIMESTAMP:2020/3/18 xx:xx:xx |
| ... | ... |

CONTROLLER FOR CONTROLLING AN INDUSTRIAL MACHINE USING A PROGRAM

RELATED APPLICATIONS

The present application is a National Phase of International Application No. PCT/JP2021/028788 filed Aug. 3, 2021, which claims priority to Japanese Application No. 2020-135198, filed Aug. 7, 2020.

TECHNICAL FIELD

The present invention relates to a controller.

BACKGROUND ART

A controller reads a machining program and controls a working machine such as a machine tool in accordance with read commands. An operator does not necessarily have to include the commands required for the control in a single machining program. For example, a command for calling another machining program may be embedded in the machining program. This call command is known as a subprogram call command (see PTL 1 and so on, for example).

When another machining program is called from the machining program, the machining program can specify a path to a folder storing the other program serving as the call destination. Alternatively, the subprogram call can also be made without specifying the path to the folder storing the call destination program. In the controller, an order of priority is set in advance in relation to a plurality of folders storing programs. In the latter case, i.e., when the path to the folder is not specified, a search is performed in accordance with the order of priority set in relation to the folders to determine whether or not a program having the specified name exists in the folder. When a program having the specified name is found, the program is called as the subprogram.

For example, the order of priority of the folders may be set as described below in points 1 to 5. In this case, when the call destination program is called from the call source program without specifying the path, the call destination program is first searched for in the folder storing the call source program and then searched for in order of LIBRARY folder→MTB2 folder→MTB1 folder→SYSTEM folder.

1. Folder storing call source program
2. Shared program folder of initial folder (LIBRARY)
3. MTB (Machine Tool Builder) dedicated folder 2 (MTB2) of initial folder
4. MTB dedicated folder 1 (MTB1) of initial folder
5. System folder (SYSTEM) of initial folder

CITATION LIST

Patent Literature

[PTL 1] Japanese Patent Application Publication No. 2019-153042

SUMMARY OF INVENTION

Technical Problem

The controller can store a plurality of programs of the same name. These programs of the same name can be distinguished by specifying the path to the folder. Moreover, even when a subprogram call is made without specifying the path to the folder, this does not cause a problem as long as the order of priority relating to folder calling is known.

However, when the operator unintentionally makes a change so that a program with the same name as the program to be called exists in a folder that is high in the order of priority, the flow of machining programs during an operation of the machine tool may differ from the intended flow.

For example, a case in which the order of priority described above is set and a program O1003 is called as a subprogram from O0001, which serves as the main program, will be considered. In this example, it is assumed that the call destination program O1003 is stored in the MTB1 folder and no programs having the name O1003 are stored in other folders. In this case, when the program O0001 is executed, even if a folder name is not specified in relation to the subprogram within the main program, the folders are searched in accordance with the set order of priority, and as a result, the program O1003 stored in the MTB1 folder is called as the subprogram.

It is now assumed that the operator reads a certain program from an external device and stores a program O1003 (referred to hereafter as O1003' so as to be distinguishable from O1003) of the same name in the LIBRARY folder. Then, when the program O0001 is executed, this time the program O1003' stored in the LIBRARY folder, which is a high-priority folder, is called as the subprogram rather than the program O1003 stored in the MTB1 folder. If the operator then inadvertently executes the program in order to start operating the machine tool, machining that differs from the intentions of the operator will be performed.

This does not cause a problem if the operator has intentionally edited the call destination program or changed the name or folder of the call destination program. However, in a case such as that described above, when a program of the same name is inadvertently stored in a high-priority folder or the like, a problem occurs in that it is difficult for the operator to notice the change in the subprogram call. Many programs are stored in the controller, making it difficult for a single operator to ascertain the call relationships between all of the programs. Moreover, when a plurality of operators use a single machine (controller), it is difficult to ascertain when a different operator has changed the arrangement of the programs in the folders or the like. To prevent this problem, means such as prohibiting files with the same name or the like may be considered, but in this case the advantages of using folders are lost.

There is therefore demand for a technique with which a change in a correspondence relationship between programs can easily be ascertained.

Solution to Problem

In an aspect of the present invention, the problem described above is solved by configuring a controller to automatically detect a change in a correspondence relationship between programs and notify an operator thereof.

An aspect of the present invention is a controller controlling an industrial machine on the basis of a program, the controller having a program storage unit that stores at least one program so that another program can be called from the program and executed, the controller including: a setting information storage unit that stores at least a folder search priority order setting defining an order of priority in which folders are searched when a program is called; a call information storage unit that stores call information, which is information relating to a correspondence relationship between a call source program and a call destination program among programs stored in advance in the program storage unit; a call information generation unit that generates call information on the basis of the programs stored in the program storage unit and the folder search priority order setting stored in the setting information storage unit when there is a possibility that the correspondence relationship between the programs has changed; and a call information determination unit that determines whether or not the correspondence relationship between the programs has changed by comparing the call information generated by the call information generation unit with the call information stored in the call information storage unit.

Advantageous Effects of Invention

According to this aspect of the present invention, when a file operation or a folder search order is changed or the like such that program call information changes, the change can be automatically detected and an operator can be notified thereof. As a result, it is possible to forestall situations in which unintended machining is performed during actual machining and situations in which a device is damaged or a staff member is injured.

BRIEF DESCRIPTION OF DRAWINGS

FIG. 3 is a view showing an example of call information.

FIG. 4 is a view showing an example of call information stored in a call information storage unit.

FIG. 5 is a view illustrating a comparison of call information performed by a call information determination unit.

FIG. 7 is a view showing another example of the call information.

DESCRIPTION OF EMBODIMENTS

An embodiment of the present invention will be described below together with the figures.

Figure 1:
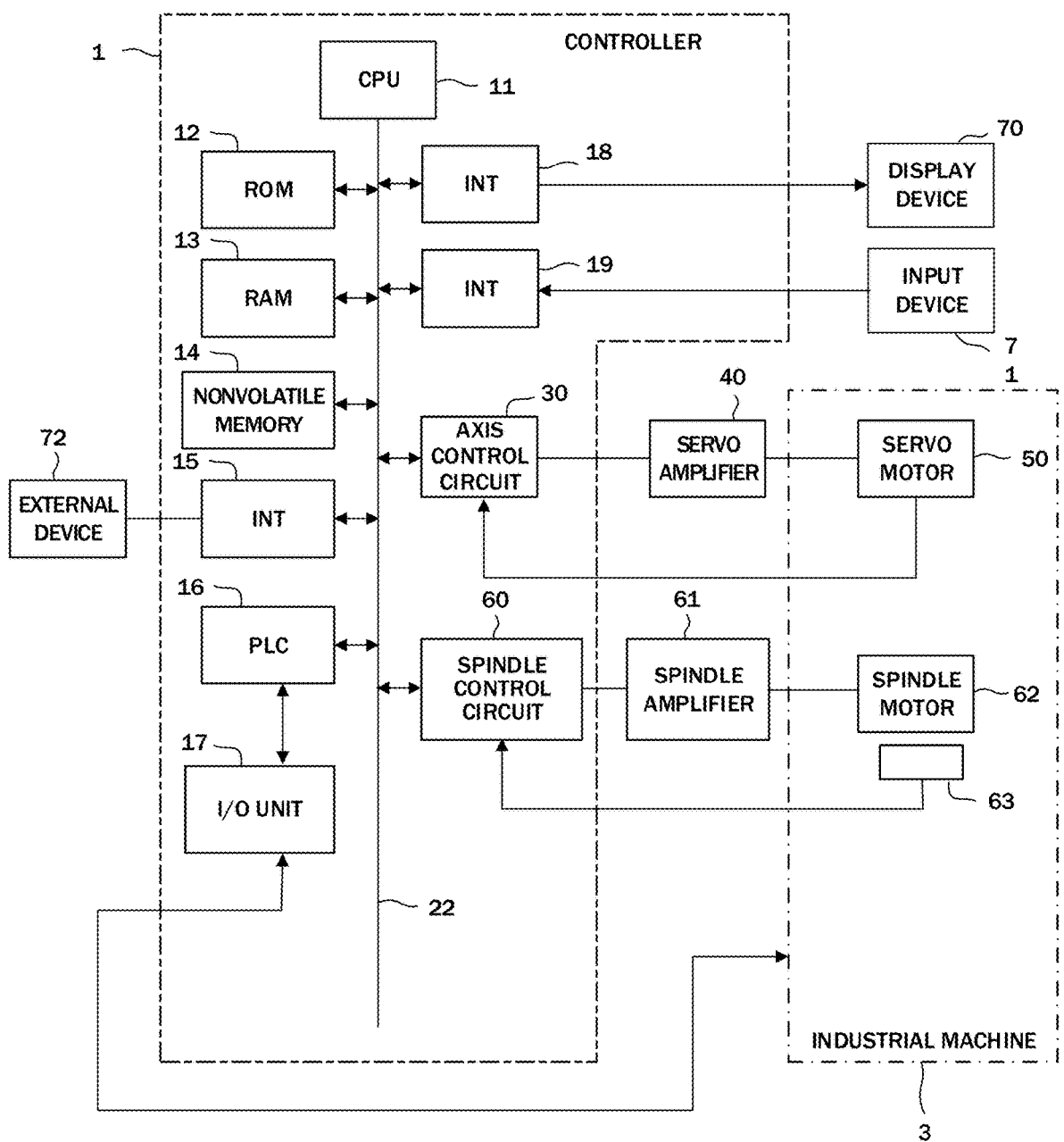
FIG. 1 is a schematic hardware configuration diagram of a controller according to a first embodiment.

FIG. 1 is a schematic hardware configuration diagram showing main parts of a controller according to a first embodiment of the present invention. A controller 1 of the present invention can be implemented as a numerical controller for controlling an industrial machine 3 such as a machine tool that performs machining, for example.

A CPU 11 provided in the controller 1 of the present invention is a processor for performing overall control of the controller 1. The CPU 11 reads a system program stored in a ROM 12 via a bus 22 and controls the entire controller 1 in accordance with the system program. A RAM 13 temporarily stores temporary calculation data and display data, various data input from the outside, and so on.

A nonvolatile memory 14 is constituted by a memory backed up by a battery, not shown in the figure, an SSD (Solid State Drive), or the like, for example, such that the storage state thereof is maintained even after a power supply of the controller 1 is switched off. The nonvolatile memory 14 stores data and machining programs read from an external device 72 via an interface 15, data and machining programs input through an input device 71, data acquired from the machine tool, and so on. The data and machining programs stored in the nonvolatile memory 14 may be expanded to the RAM 13 during execution/use. Furthermore, various system programs, such as a well-known analysis program, are written in advance to the ROM 12.

The interface 15 is an interface for connecting the CPU 11 of the controller 1 to the external device 72, such as a USB device. For example, a machining program, parameters, and so on used to control the machine tool can be read from the external device 72 side. Further, a machining program, parameters, and so on that have been edited in the controller 1 can be stored in external storage means via the external device 72. A PLC (Programmable Logic Controller) 16 controls the machine tool and peripheral devices of the machine tool (for example, a tool replacement device, an actuator such as a robot, a sensor attached to the machine tool, and so on) by outputting signals thereto via an I/O unit 17 in accordance with a sequence program built into the controller 1. Further, the PLC 16 receives signals from various switches on an operating panel installed on a main body of the industrial machine, the peripheral devices, and so on, and after performing required signal processing thereon, transfers the signals to the CPU 11.

Data read on the memory, data acquired as a result of executing the machining programs, system programs, and so on, and the like are output to a display device 70 via an interface 18 and displayed thereon. Further, the input device 71, which is constituted by a keyboard, a pointing device, or the like, transfers commands, data, and so on based on operations performed by an operator to the CPU 11 via an interface 19.

An axis control circuit 30 for controlling an axis provided in the machine tool receives an axis movement command amount from the CPU 11 and outputs an axis command to a servo amplifier 40. The servo amplifier 40 receives the command and drives a servo motor 50 for moving a drive unit provided in the machine tool of the industrial machine 3 along the axis. The servo motor 50 of the axis has an inbuilt position/speed detector and feeds back a position/speed feedback signal from the position/speed detector to the axis control circuit 30. The axis control circuit 30 performs feedback control on the position and speed of the servo motor 50. Note that on the hardware configuration diagram of FIG. 1, the axis control circuit 30, the servo amplifier 40, and the servo motor 50 are each shown singly, but in actuality, these components are prepared in a number corresponding to the number of axes provided in the machine tool serving as the control subject. For example, when a typical machine tool is controlled, three sets of the axis control circuit 30, the servo amplifier 40, and the servo motor 50 are prepared in order to move a spindle to which a tool is attached and a workpiece relatively in three linear axial directions (an X axis, a Y axis, and a Z axis).

A spindle control circuit 60 receives a spindle rotation command and outputs a spindle speed signal to a spindle amplifier 61. The spindle amplifier 61 receives the spindle speed signal and drives the tool by rotating a spindle motor 62 of the machine tool at the commanded rotation speed. A position coder 63 is coupled to the spindle motor 62. The position coder 63 outputs a feedback pulse in synchronization with the rotation of the spindle, and the feedback pulse is read by the CPU 11.

Figure 2:
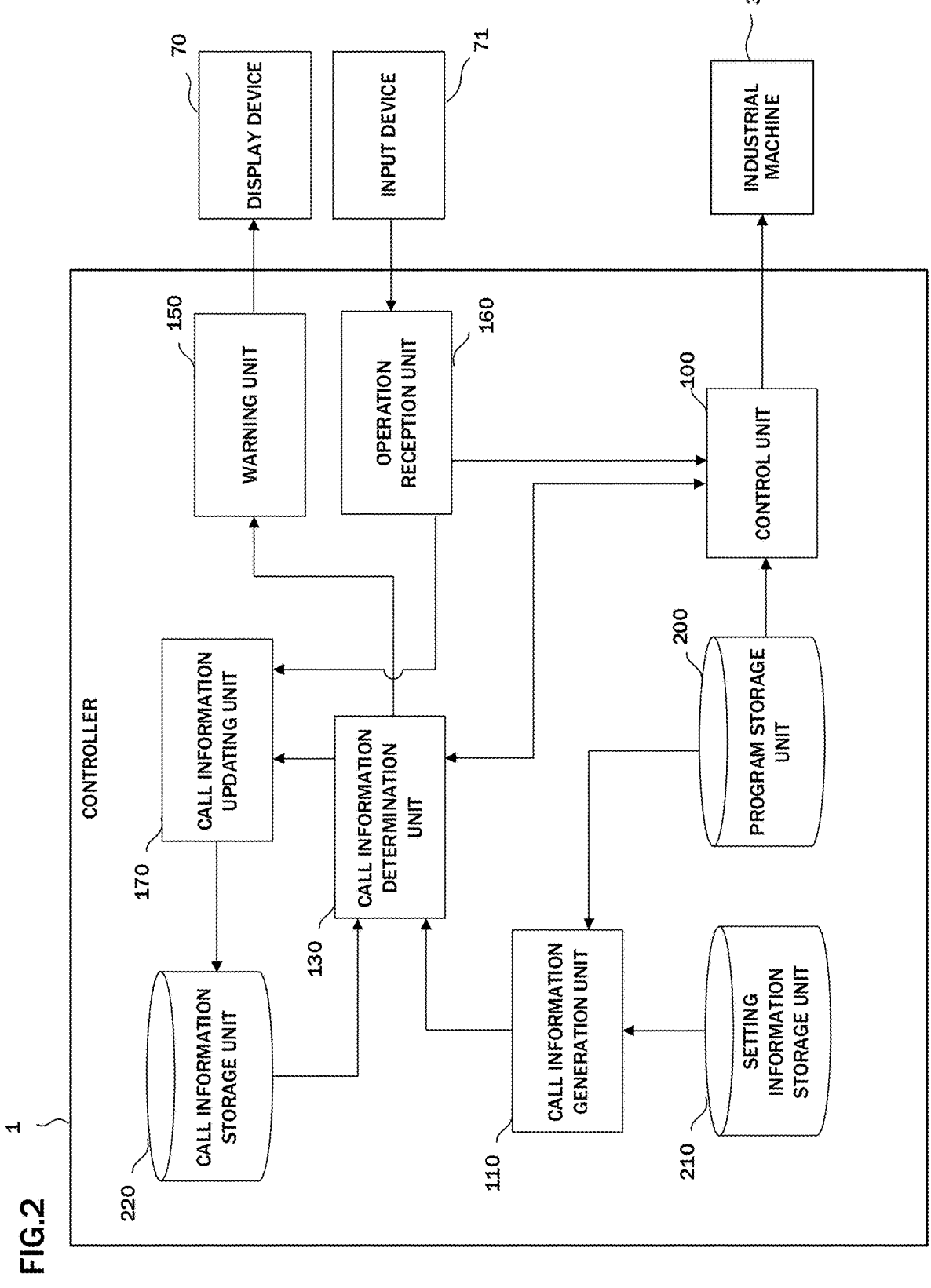
FIG. 2 is a schematic function block diagram of the controller according to the first embodiment.

FIG. 2 is a schematic block diagram showing functions of the controller 1 according to the first embodiment of the present invention. The functions of the controller 1 according to this embodiment are realized by having the CPU 11 provided in the controller 1 shown in FIG. 1 execute the system program so as to control operations of the respective parts of the controller 1.

The controller 1 of this embodiment includes a control unit 100, a call information generation unit 110, a call information determination unit 130, a warning unit 150, an operation reception unit 160, and a call information updating unit 170. Further, a program storage unit 200 that serves as an area for storing programs such as a program executed as a main program and a program called as a subprogram, a setting information storage unit 210 that stores various setting information of the controller, including a setting of a folder search priority order used when calling a program, and a call information storage unit 220 that serves as an area for storing information relating to correspondence relationships between the programs are provided in advance in the RAM 13 and/or the nonvolatile memory 14 of the controller 1.

The control unit 100 is realized by having the CPU 11 provided in the controller 1 shown in FIG. 1 execute the system program, which is read from the ROM 12, such that mainly, calculation processing is performed by the CPU 11 using the RAM 13 and the nonvolatile memory 14, control processing is performed on the servo motor 50 by the axis control circuit 30 and the servo amplifier 40, control processing is performed on the spindle motor 62 by the spindle control circuit 60 and the spindle amplifier 61, and control processing is performed on the peripheral devices and so on using the PLC 16. The control unit 100 analyzes commands issued in accordance with the programs read from the program storage unit 200. On the basis of the analysis results, movement command data relating to the respective servo motors, spindle command data commanding the rotation speed of the spindle, control command data commanding control of the peripheral devices, and so on are generated. By outputting the generated command data to the respective units, the servo motor 50, the spindle motor 62, and the peripheral devices and so on are controlled. The details of the control operations performed by the control unit 100 are already well-known, and therefore detailed description thereof has been omitted from the present specification.

The call information generation unit 110 is realized by having the CPU 11 provided in the controller 1 shown in FIG. 1 execute the system program, which is read from the ROM 12, such that mainly, calculation processing is performed by the CPU 11 using the RAM 13 and the nonvolatile memory 14. The call information generation unit 110 generates call information, which includes information relating to correspondence relationships between programs, on the basis of subprogram call commands included in the plurality of programs stored in the program storage unit 200 and the setting of the folder search priority order used when calling a program, which is set in the setting information storage unit 210. Note that in the present specification, the "subprogram call command" includes not only a command by which, after the call destination program is called and processing is performed, the processing returns to the call source program, but also a command by which, after the call destination program is called, the processing does not return to the call source program. The call information generation unit 110 extracts a subprogram call command from each program. Next, when the extracted subprogram call command includes a folder path, the call information generation unit 110 generates call information in which the relevant program is set as the call source program and the program to be called as a subprogram from the program is set as the call destination program.

FIG. 3 is a view showing an example of the call information. The example of FIG. 3 shows call information indicating that a program with the name O1001, which is stored in the folder known as LIBRARY, is being called from a program with the name O0001, which is stored in the folder known as FOLDER1, call information indicating that a program with the name O4002, which is stored in the folder known as LIBRARY, is being called from the program O0001, and call information indicating that a program with the name O5003, which is stored in the folder known as MTB2, is being called from the program O0001. As shown in FIG. 3, the call information indicates the correspondence relationship between the call source program and the call destination program. The call information includes at least a set of the program name, including the folder path, of the call source program and the program name, including the folder path, of the call destination program. By including the folder path in each program name, the programs stored in the program storage unit 200 of the controller 1 can be identified univocally. By employing this storage method, a program of the same name stored in a different folder can be identified univocally as a different program.

The call information generation unit 110 generates the call information when there is the possibility that the correspondence relationship between the programs has changed. The possibility that the correspondence relationship between the programs has changed may occur when, for example, a program is added to the program storage unit 200, a program is deleted, a program is moved, or a program name is changed. The possibility that the correspondence relationship between the programs has changed may also occur when the setting of the folder search priority order used when calling a program, which is stored in the setting information storage unit 210, is changed. The possibility that the correspondence relationship between the programs has changed may also occur when the programs stored in the program storage unit 200 are edited, for example. The reason for this is that the subprogram call commands may be changed by editing the programs.

The call information determination unit 130 is realized by having the CPU 11 provided in the controller 1 shown in FIG. 1 execute the system program, which is read from the ROM 12, such that mainly, calculation processing is performed by the CPU 11 using the RAM 13 and the nonvolatile memory 14. The call information determination unit 130 determines whether or not the correspondence relationship between the programs has actually changed. The call information determination unit 130 compares the call information generated by the call information generation unit 110 with the call information stored in the call information storage unit 220. When there is a difference in the call information, it is determined that the correspondence relationship between the programs has actually changed, and the warning unit 150 is instructed to output a warning. Further, when a difference is detected in the call information relating to the program currently being operated by the control unit 100, the call information determination unit 130 may instruct the control unit 100 to temporarily stop the operation.

FIG. 4 shows an example of the call information stored in the call information storage unit 220. The call information storage unit 220 stores the call information generated in advance by the call information generation unit 110. The call information stored in the call information storage unit 220 may be generated by the call information generation unit 110 in relation to the programs stored in the program storage unit 200 when the controller 1 is activated for the first time, for example, whereupon the generated call information may be stored. Alternatively, the call information stored in the call information storage unit 220 may be generated by the call information generation unit 110 in relation to the programs stored in the program storage unit 200 in response to a command from the operator, for example, whereupon the generated call information may be stored. The call information is then updated by the call information updating unit 170 as required.

As shown in FIG. 5, when there is the possibility that the correspondence relationship between the programs has changed, the call information determination unit 130 compares the call information stored in the call information storage unit 220 with the call information generated by the call information generation unit 110 to determine whether or not the call information stored in the call information storage unit 220 includes call information that matches the call information generated by the call information generation unit 110. When matching call information is not stored, it may be determined that there is a difference in the call information, and the warning unit 150 may be instructed to output a warning.

The warning unit 150 is realized by having the CPU 11 provided in the controller 1 shown in FIG. 1 execute the system program, which is read from the ROM 12, such that mainly, calculation processing is performed by the CPU 11 using the RAM 13 and the nonvolatile memory 14 and output processing is performed using the interface 18, for example. Upon receiving a command from the call information determination unit 130, the warning unit 150 outputs a warning indicating that the information relating to the correspondence relationship between the programs has been changed. Typically, the warning unit 150 may output a warning display indicating that the information relating to the correspondence relationship between the programs has been changed to the display device 70. The warning unit 150 may also issue a warning to the operator using sound, a lamp, or the like in addition to the display. Furthermore, the warning unit 150 may transmit and output a warning to a host computer or the like for managing a workshop over a network, not shown in the figures.

Figure 6:
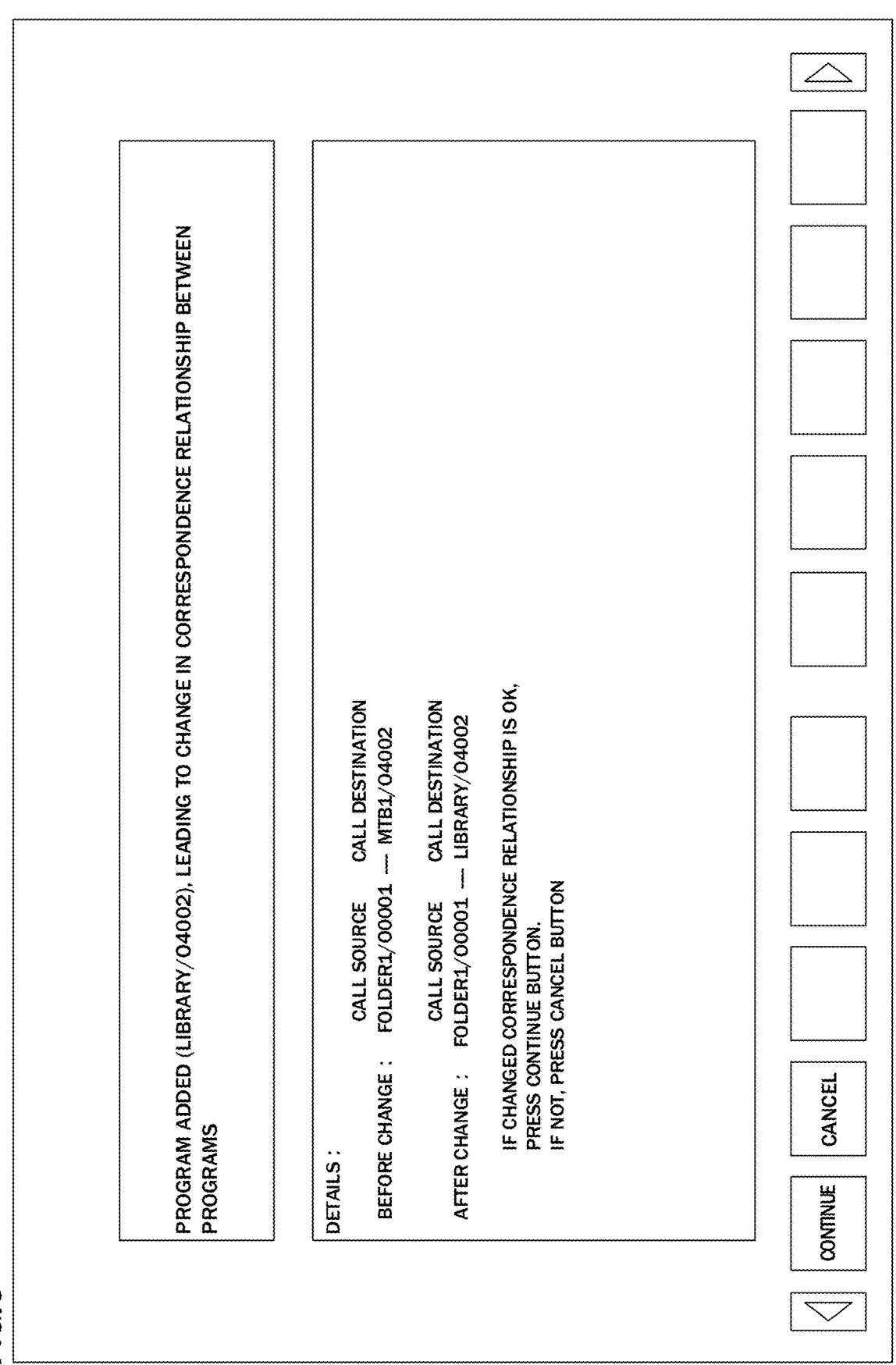
FIG. 6 is a view showing an example of a warning message.

FIG. 6 shows an example of a warning message output by the warning unit 150 and displayed on the display device 70. The warning message output by the warning unit 150 and displayed on the display device 70 may include a message indicating the nature of the change leading to the change in the correspondence relationship between the programs, for example. The nature of the change leading to the change in the correspondence relationship between the programs can be specified by, for example, collating an operation log, an activation log, or the like of the controller 1 with the name of the call destination program in the call information determined by the call information determination unit 130 not to match. The warning message output by the warning unit 150 and displayed on the display device 70 may also include a message indicating the correspondence relationship between the programs before the change and the correspondence relationship between the programs after the change, for example. This message may likewise be specified by, for example, collating an operation log, an activation log, or the like of the controller 1 with the name of the call destination program in the call information determined by the call information determination unit 130 not to match.

The operation reception unit 160 is realized by having the CPU 11 provided in the controller 1 shown in FIG. 1 execute the system program, which is read from the ROM 12, such that mainly, calculation processing is performed by the CPU 11 using the RAM 13 and the nonvolatile memory 14 and input processing is performed using the interface 19, for example. The operation reception unit 160 receives an operation from the operator in response to the warning from the warning unit 150. When the operator inputs a message indicating that there is no problem with the change in the correspondence relationship between the programs, the operation reception unit 160 commands the call information updating unit 170 to update the call information stored in the call information storage unit 220 with the call information generated by the call information generation unit 110. At this time, when the operation performed by the control unit 100 has been temporarily stopped, the operation reception unit 160 may command the control unit 100 to resume the operation. When, on the other hand, the operator inputs a message indicating that there is a problem with the change in the correspondence relationship between the programs, the operation reception unit 160 may issue a command to a function, not shown in the figures, for managing the programs stored in the program storage unit 200 or the like to prompt the operator to correct the problem.

The call information updating unit 170 is realized by having the CPU 11 provided in the controller 1 shown in FIG. 1 execute the system program, which is read from the ROM 12, such that mainly, calculation processing is performed by the CPU 11 using the RAM 13 and the nonvolatile memory 14. The call information updating unit 170 receives a command from the operation reception unit 160, and when there is the possibility that the correspondence relationship between the programs has changed, updates the call information stored in the call information storage unit 220 with the call information generated by the call information generation unit 110.

The controller 1 according to this embodiment, having the configuration described above, determines whether or not the correspondence relationship between the programs has actually changed when there is the possibility that the correspondence relationship between the programs has changed due to a program being added or deleted, the setting of the folder search priority order used during a program call being modified, or the like, and when the correspondence relationship has changed, the controller 1 halts the operation and warns the operator. As a result, the operator can easily ascertain changes in the correspondence relationships between the programs, which were previously difficult to notice. The controller 1 according to this embodiment can respond to not only cases in which a program is added or deleted by the operator him/herself, but also cases in which the correspondence relationships between the programs are modified due to another operator adding or deleting a program, the programs being automatically updated over a network from a computer that manages the controller 1, and so on.

As a modified example of the controller 1 according to this embodiment, as shown in FIG. 7, the call information generated by the call information generation unit 110 may also include, in addition to the program names, including the folder paths, of the call source and call destination programs, information indicating file attributes such as the file size and a time stamp. Thus, when a program with a different name is written over a program already stored in a folder or the like, for example, it is possible to detect that the program has changed from the change in the file attributes.

An embodiment of the present invention was described above, but the present invention is not limited only to the example of the embodiment described above and may be implemented in various forms by adding appropriate modifications thereto.

REFERENCE SIGNS LIST

1 Controller
3 Industrial machine
11 CPU
12 ROM
13 RAM
14 Nonvolatile memory
15, 18, 19 Interface
16 PLC
17 I/O unit
22 Bus
30 Axis control circuit
40 Servo amplifier
50 Servo motor
60 Spindle control circuit
61 Spindle amplifier
62 Spindle motor
63 Position coder
70 Display device
71 Input device
72 External device
100 Control unit
110 Call information generation unit
130 Call information determination unit
150 Warning unit
160 Operation reception unit
170 Call information updating unit
200 Program storage unit
210 Setting information storage unit
220 Call information storage unit

The invention claimed is:

1. A controller controlling an industrial machine using a program, the controller comprising:
a display device;
a non-transitory memory that stores
programs including at least one program from which another program can is called and executed;
at least a folder search priority order setting defining an order of priority in which folders are searched when the another program is called; and
call information, which is information relating to a correspondence relationship between a call source program and a call destination program among the programs stored in advance in the non-transitory memory; and
a processor configured to:
in response to a possibility that a correspondence relationship between the programs has changed, generate call information using the programs and the folder search priority order setting;
determine whether or not the correspondence relationship between the programs has changed by comparing the generated call information with the call information stored in the non-transitory memory; and
in response to determining that the correspondence relationship between the programs has changed, output a warning to the display device to facilitate ascertaining a change in the correspondence relationship between the programs, thereby forestalling unintended machining during actual machining, damage to the industrial machine, or an injury to staff.

2. The controller according to claim 1, wherein the processor is configured to, in response to determining that the correspondence relationship between the programs has changed, stop an operation of the industrial machine.

3. The controller according to claim 1, further comprising:
an input device,
wherein the processor is configured to update the call information stored in the non-transitory memory with the generated call information based on an operation of the input device performed by an operator.

4. The controller according to claim 1, wherein the call information includes at least a program name for each of the call source program and the call destination program and path names for folders storing the respective programs.

5. The controller according to claim 4, wherein the call information further includes at least one of a file size and a time stamp for each of the call source program and the call destination program.

6. The controller according to claim 1, wherein the possibility that the correspondence relationship between the programs has changed occurs in response to (i) a program being added to the non-transitory memory, a program being deleted, a program being moved, or a program name being changed, (ii) the folder search priority order setting used during a program call being modified, or (iii) the programs stored in the non-transitory memory being edited.

7. The controller according to claim 1, wherein the possibility that the correspondence relationship between the programs has changed occurs in response to a program being added to the non-transitory memory, a program being deleted, a program being moved, or a program name being changed.

8. The controller according to claim 1, wherein the possibility that the correspondence relationship between the programs has changed occurs in response to the folder search priority order setting used during a program call being modified.

9. The controller according to claim 1, wherein the possibility that the correspondence relationship between the programs has changed occurs in response to the programs stored in the non-transitory memory being edited.

10. A controller controlling an industrial machine using a program, the controller comprising:
a non-transitory memory that stores
programs including at least one program from which another program is called and executed;
at least a folder search priority order setting defining an order of priority in which folders are searched when the another program is called; and
call information, which is information relating to a correspondence relationship between a call source program and a call destination program among the programs stored in advance in the non-transitory memory; and
a processor configured to:
in response to a possibility that a correspondence relationship between the programs has changed, generate call information using the programs and the folder search priority order setting;
determine whether or not the correspondence relationship between the programs has changed by comparing the generated call information with the call information stored in the non-transitory memory; and in response to determining that the correspondence
relationship between the programs has changed, stop
an operation of the industrial machine.

* * * * *